United States Patent
Zuckerman et al.

(10) Patent No.: US 8,897,105 B1
(45) Date of Patent: Nov. 25, 2014

(54) SOLID IMMERSION MIRROR WITH FILL MATERIAL BETWEEN INNER AND OUTER SIDEWALLS

(71) Applicant: Seagate Technology LLC, Cupertino, CA (US)

(72) Inventors: Neil Zuckerman, Eden Prairie, MN (US); Chris Rea, Edina, MN (US); Scott E. Olson, Eagan, MN (US); Zoran Jandric, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/910,032

(22) Filed: Jun. 4, 2013

(51) Int. Cl.
*G11B 11/00* (2006.01)
*G11B 5/48* (2006.01)
*G11B 13/04* (2006.01)

(52) U.S. Cl.
CPC ............. *G11B 13/04* (2013.01); *G11B 5/4866* (2013.01)
USPC ................. 369/13.33; 369/13.32; 369/112.29

(58) Field of Classification Search
None
See application file for complete search history.

(56) References Cited

U.S. PATENT DOCUMENTS

| | | | |
|---|---|---|---|
| 6,130,864 A | 10/2000 | Burroughs | |
| 7,742,368 B2 | 6/2010 | Lee et al. | |
| 7,864,434 B2 * | 1/2011 | Peng | 359/642 |
| 8,451,705 B2 * | 5/2013 | Peng et al. | 369/112.27 |
| 2011/0211428 A1 * | 9/2011 | Batra et al. | 369/13.33 |
| 2012/0218871 A1 | 8/2012 | Balamane et al. | |
| 2012/0314549 A1 * | 12/2012 | Lee et al. | 369/13.33 |
| 2013/0258825 A1 * | 10/2013 | Seigler et al. | 369/13.33 |
| 2014/0029397 A1 * | 1/2014 | Rausch et al. | 369/13.24 |
| 2014/0177407 A1 * | 6/2014 | Peng et al. | 369/13.33 |

* cited by examiner

*Primary Examiner* — Brenda Bernardi
(74) *Attorney, Agent, or Firm* — Hollingsworth Davis, LLC

(57) ABSTRACT

An apparatus includes a solid immersion mirror with opposing, reflective, inner sidewalls having inner surfaces facing a focal region and outer surfaces opposite the inner surfaces. The solid immersion mirror also include opposing outer sidewalls spaced apart from and facing the outer surfaces of the inner sidewalls, and a fill material between the inner sidewalls and outer sidewalls. The apparatus also includes a near-field transducer located in the focal region proximate a media-facing surface.

17 Claims, 4 Drawing Sheets

SOLID IMMERSION MIRROR WITH FILL MATERIAL BETWEEN INNER AND OUTER SIDEWALLS

SUMMARY

The present disclosure is directed to a solid immersion mirror with fill material between inner and outer sidewalls. In one embodiment, an apparatus includes a solid immersion mirror with opposing, reflective, inner sidewalls having inner surfaces facing a focal region and outer surfaces opposite the inner surfaces. The solid immersion mirror also include opposing outer sidewalls spaced apart from and facing the outer surfaces of the inner sidewalls, and a fill material between the inner sidewalls and outer sidewalls. The apparatus also includes a near-field transducer located in the focal region proximate a media-facing surface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
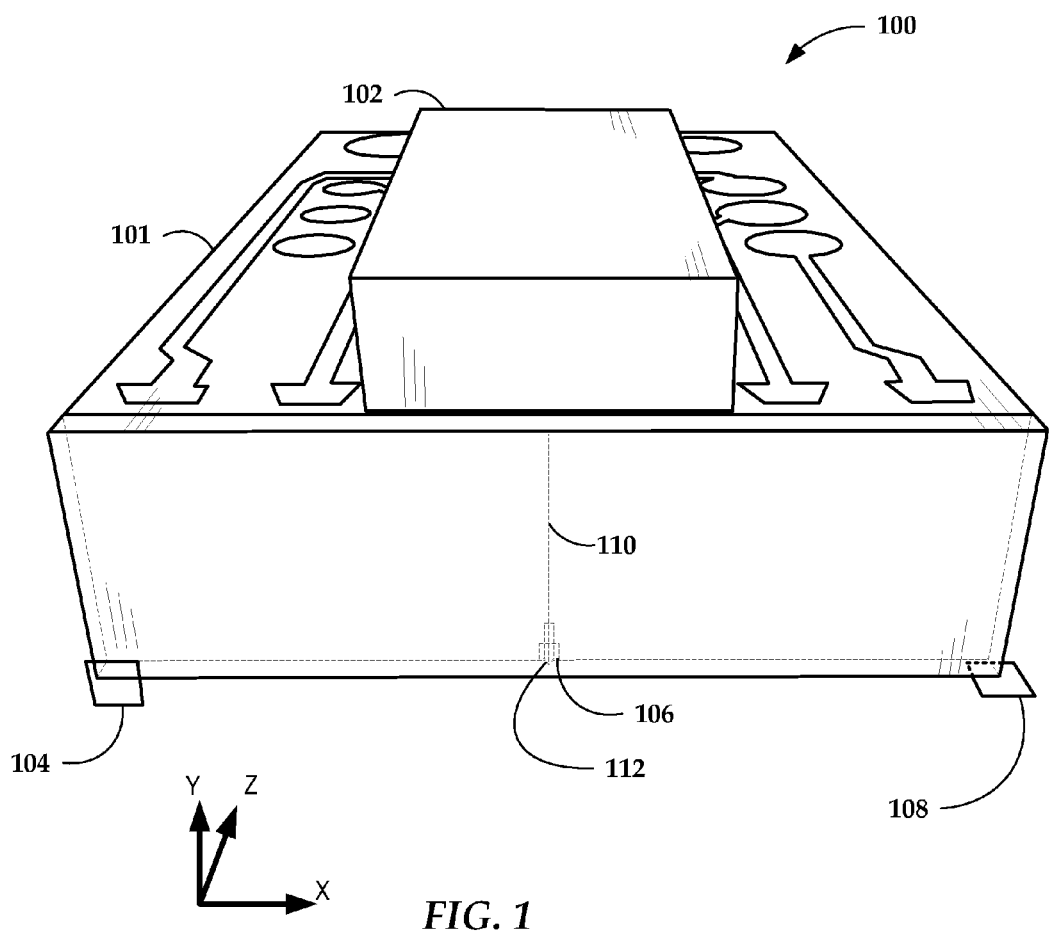
FIG. 1 is an isometric view of a heat-assisted, magnetic recording, hard drive slider according to an example embodiment.

The present disclosure generally relates to magnetic recording devices used for data storage. In embodiments described below, methods and apparatuses are described that facilitate transferring energy to heat a magnetic recording medium. This may be used, for example, in heat-assisted magnetic recording (HAMR) devices, which may also be described as thermal-assisted magnetic recording (TAMR) and energy-assisted magnetic recording (EAMR). Generally, a HAMR device uses a laser diode or other energy source to heat a magnetic medium while the device is recording data to the medium.

A HAMR data storage medium has a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a transducer (e.g., magnetic write pole). After the heat is removed, the region will maintain its magnetic state, thereby reliably storing the data for later retrieval.

A HAMR read/write element, sometimes referred to as a slider or read/write head, includes magnetic read and write transducers similar to those on current hard drives. For example, data may be read by a magnetoresistive sensor that detects magnetic fluctuations of the moving medium. Data may be written to the magnetic medium by a write coil that is magnetically coupled to a write pole. A HAMR slider will also generally include a source of energy, such as a laser diode, and an optical delivery path through the slider that delivers the energy to the surface of the medium.

The optical delivery path of a HAMR slider may include a near-field transducer (NFT) proximate a media-facing surface (e.g., air-bearing surface, contact surface). The NFT focuses and transmits the energy to a small region on the medium. The NFT is sometimes referred to as an optical antenna, surface plasmon resonator, etc., and is usually formed at least in part of a plasmonic metal such as gold, silver, copper, aluminum, etc., and alloys thereof. The NFT for a HAMR device is very small (e.g., on the order of 10 to 100 nm, or any value therebetween) and creates a localized region of high transmitted power density in the media through an electromagnetic interaction. This results in a high temperature rise in a small region on the media, with the region exceeding the Curie temperature having dimensions less than 100 nm.

Due to the highly localized nature of the heat at the NFT, the NFT and surrounding regions may protrude significantly from the media-facing surface. This protrusion makes the device susceptible to damage due to contact with the media surface. The localized NFT protrusion can also make it difficult to determining whether contact has occurred, because some contact detection schemes may rely on sensors or events that are located relatively far from the NFT. As such, the detection schemes may not be able to accurately measure the NFT protrusion, which may increase risk of contact and/or require less-than-optimal separation distances between the slider and media surface.

In the embodiments described below, the NFT is proximate a planar, solid immersion mirror (SIM), also sometimes referred to as a solid immersion lens. The SIM may be configured as parabolic-shaped sidewalls walls covered with a reflective material. The sidewalls focus light onto the NFT, which is located at a focal region. Heating of the NFT under laser irradiation causes a localized protrusion of several nanometers, occurring over a slider surface region extending several microns uptrack, downtrack, and crosstrack. In some cases the protrusion region of the NFT can be quite localized, single nanometers of protrusion occurring over surface dimensions at the media-facing surface on the order of 10 to 100 nm.

In embodiments described below, additional structure is added to the SIM to help control and/or reduce localized, thermal, protrusion near the NFT, as well as reducing temperatures proximate the NFT. Using the structural enhancements described below, an example 1 nm of protrusion can move from being located in an area less than 0.01 $\mu m^2$ area to an area greater than 10 $\mu m^2$. The structural enhancements can elevate a "bumper" or "landing pad" proximate the NFT. During operation, contact occurs first at the bumper or landing pad, which shelters the NFT and other components from damage. This can result in longer life and increased device reliability.

In reference to FIG. 1, a perspective view shows HAMR slider assembly 100 according to an example embodiment. The slider assembly 100 includes a laser diode 102 located on top of a slider body 101 and proximate to a trailing edge surface 104 of the slider body 101. The laser diode 102 delivers light proximate to a HAMR read/write head 106, which has one edge on a media-facing surface 108 of the slider body 101. The media-facing surface 108 faces and is held proximate to a moving media surface (not shown) during device operation. The media-facing surface 108 may be configured as an air-bearing surface (ABS) that maintains separation from the media surface via a thin layer of air.

The laser diode 102 provides electromagnetic energy to heat the media at a point near to the read/write head 106. Optical coupling components, such as a waveguide 110, are formed integrally within the slider device 100 and form an optical coupling path that delivers light from the laser 102 to the media. In particular, a local waveguide 110 and SIM/NFT 112 may be located proximate the read/write head 106 to provide local heating of the media during write operations.

The laser diode 102 in this example may be an integral, edge firing device, although it will be appreciated that the waveguide 110 and SIM/NFT 112 may be used with any energy source and energy delivery mechanisms. For example, a surface emitting laser (SEL) may be used instead of an edge firing laser. In other examples, a laser similar to laser diode 102 may be mounted elsewhere on the slider 100, e.g., the trailing edge surface 104. The laser 102 may also be coupled to the slider 101 via a coupling component such as a submount (not shown).

While the example in FIG. 1 shows a laser 102 integrated with the slider 100, the SIM/NFT 112 discussed herein may be applicable to any type of light delivery configuration. For example, in a free-space light delivery configuration, a laser may be mounted externally to the slider, and coupled to the slider by way of optic fibers and/or waveguides. The slider in such an arrangement may include a grating coupler into which light is coupled and delivered to a slider-integrated waveguide 110 which energizes the SIM/NFT 112.

Figure 2:
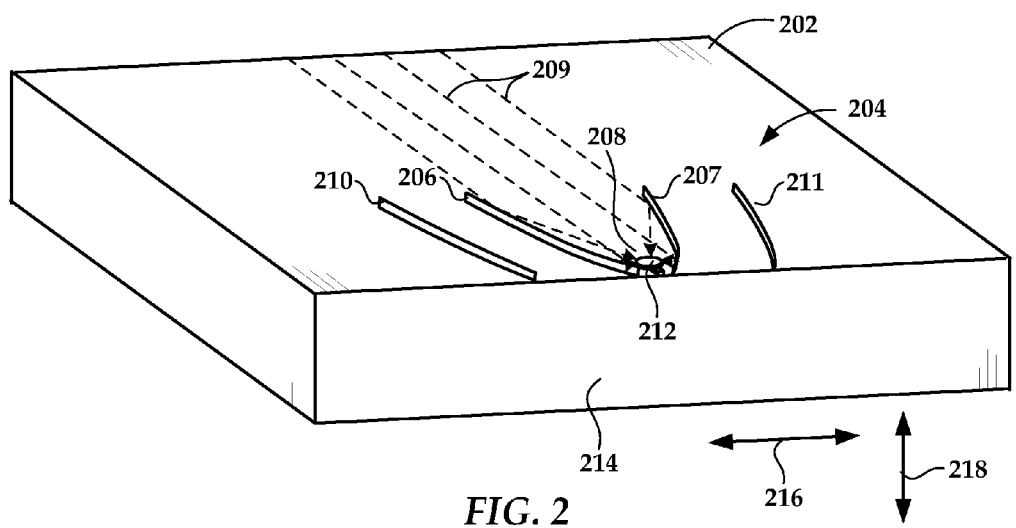
FIG. 2 is an isometric view showing sidewalls of a solid immersion mirror according to an example embodiment.

The SIM/NFT 112 include features that reduce temperatures and/or thermal protrusion of the near-field transducer from the media-facing surface 108. These features are shown in the isometric views of example embodiments in FIGS. 2 and 3 (not to scale). In FIG. 2, a portion of a substrate 202 has a solid immersion mirror 204 formed on a surface. The solid immersion mirror 204 includes opposing, reflective, inner sidewalls 206, 207. The inner sidewalls 206, 207 have inner surfaces facing a focal region 208 and outer surfaces opposite the inner surfaces. The inner sidewalls 206, 207 are formed of or coated with a reflective material (e.g., gold, silver, aluminum, etc., or alloys thereof) and have a shape (e.g., parabolic) that causes incoming light rays 209 to be reflected to the focal region 208.

A near-field transducer 212 is located in the focal region 208 and proximate a media-facing surface 214. The light rays 209 are directed to the near-field transducer 212 which causes excitement of surface plasmons on the near-field transducer 212. The near-field transducer 212 has a shape that causes a narrow beam of the surface plasmon energy to be directed out of the media-facing surface 214 during recording.

Figure 3:
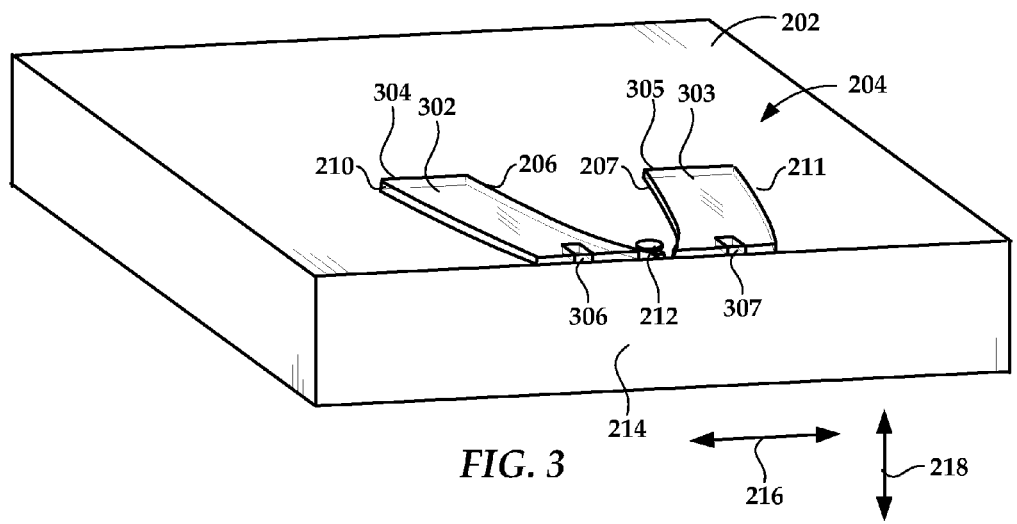
FIG. 3 is an isometric view showing fill material of a solid immersion mirror according to another example embodiment.
Figure 4:
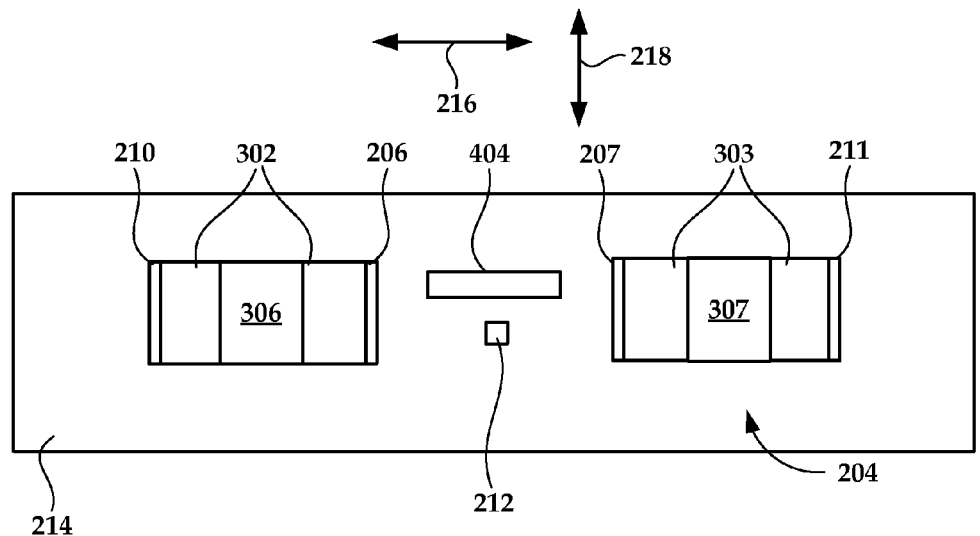
FIG. 4 is a media-facing-surface-view of a solid immersion mirror according an example embodiment.

Arrow 216 in FIG. 2 represents a cross-track direction and arrow 218 represents a downtrack direction. Generally, the medium moves relative to the slider in the downtrack direction 218 during reading and recording, and the slider moves between tracks on the recording medium along the cross track direction 216. The arrows indicating cross track direction 216 and downtrack direction 218 are also shown in FIGS. 3 and 4.

The solid immersion mirror 204 further includes opposing outer sidewalls 210, 211 spaced apart from and facing the outer surfaces of the inner sidewalls 206, 207. As seen in FIG. 3, portions of fill material 302, 303 are placed between the inner sidewalls 206, 207 and respective outer sidewalls 210, 211. The fill material 302, 303 could be, for example, metallic sputtered or plated. A seen in this view, the fill material 302, 303 extends to the media-facing surface 214. The fill material 302, 303 also extends to the back edges 304, 305 of the solid immersion mirror 204. The back edges 304, 305 and/or outer sidewalls 210, 211 may also be formed of or coated with a reflective material similar to that of the inner sidewalls 206, 207.

The fill material 302, 303 is selected based on its thermal and mechanical properties. The fill material may be selected from a thermally conductive material, chosen to function as a heat sink to reduce the temperature of the NFT and other writer components. Additionally, this heat sinking can reduce the protrusion of the NFT. The fill material may also be selected to protrude and contact the media during some conditions when the head would contact the media. In this function it operates as a bumper or landing pad. The fill material may simultaneously accomplish these goals of heat sink and bumper or landing pad.

The fill material 302, 303 may include a metal such as an alloy of Fe (e.g., NiFe, CoNiFe, or CoFe). The fill material 302, 303 may include other metals such as Cr, Ta, and Ru. The fill material 302, 303 may include a dielectric material. For example, the fill material 302, 303 may include a nitride such as TaN and SiN. Additional structures, such as lapping guides 306, 307 may be embedded in part of the fill material 302, 303 regions at the media-facing surface 214. The lapping guides 306, 307 may also be selected to act as bumpers or landing pads, in addition to or instead of the edges of fill material 302, 303.

As shown in FIGS. 2 and 3, the outer sidewalls 210, 211 are parabolic, expanded and offset from the parabolic inner sidewalls 206, 207. Together, the sidewalls 206, 207, 210, 211 and fill material 302, 303 act as both an optical focusing element and assist in mechanical stabilization at the media-facing surface 214 during localized heating of the region. The fill material 302, 303 can draw heat away from the near-field transducer 212, reducing temperatures therein. Further, the fill material 302, 303 may enlarge a region of protrusion around the near-field transducer 212, such that if and when contact with the recording medium does occur, the impact is more widely distributed or occurs away from the near-field transducer. This can reduce wear on the near-field transducer 212 and minimize contamination of the media-facing surface 214. The fill material 302, 303 may also assist in blocking stray light from exiting around the solid immersion mirror 204.

In FIG. 4, a plan view (not to scale) shows a media-facing surface 214 of a slider portion as shown in FIGS. 2 and 3. This view illustrates how the sidewalls 206, 207, 210, 211 and fill material 302, 303 may be seen at the media-facing surface 214. The fill material 302, 303 may optionally be interrupted or segmented to make space for lapping guides 306, 307 or other features. The near-field transducer 212 is also shown between the portions of the solid immersion mirror 204, as is the tip of a magnetic write pole 404. A return pole (not shown) may be located in the downtrack direction 218 relative to the write pole 404.

Generally, the sidewalls 206, 207, 210, 211, fill material 302, 303, near-field transducer 212, and write pole 404 may be surrounded by a dielectric material. These and other components (e.g., read transducers, waveguides) are formed using integrated optics processes known in the art, such as layer deposition, photolithography, etching, polishing, planarization, etc.

Figure 5:
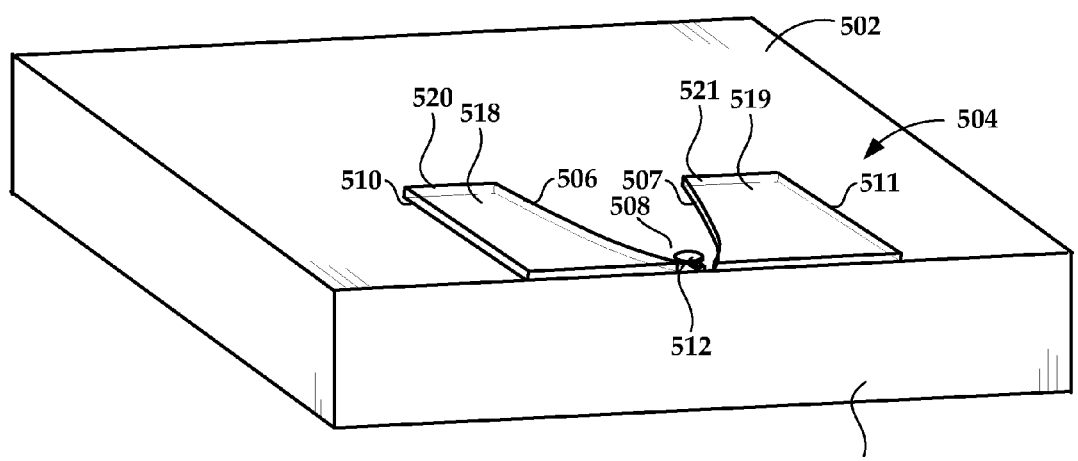
FIG. 5 is an isometric view a solid immersion mirror according to another example embodiment.

In reference now to FIG. 5, an isometric view shows a portion of a substrate 502 having a solid immersion mirror 504 formed on a surface. The solid immersion mirror 504 includes opposing, reflective, inner sidewalls 506, 507. The inner sidewalls 506, 507 have inner surfaces facing a focal region 508 and outer surfaces opposite the inner surfaces. The inner sidewalls 506, 507 are formed of a reflective material and have a shape (e.g., parabolic) that causes incoming light rays to be reflected to the focal region 508. A near-field transducer 512 is located in the focal region 208 and proximate a media-facing surface 514.

The solid immersion mirror 504 further includes opposing outer sidewalls 510, 511 spaced apart from and facing the outer surfaces of the inner sidewalls 506, 507. As with the inner sidewalls 506, 507, the outer sidewalls 510, 511 may be formed of or be coated with a reflective material. Unlike the previous example, the outer sidewalls 510, 511 do not have a similar shape (e.g., parabolic) as the inner sidewalls 506, 507. In this example, the outer sidewalls 510, 511 are generally straight and normal to the media-facing surface 514. This results in fill materials 518, 519 that are disposed between the inner sidewalls 506, 507 and outer sidewalls 510, 511 having a larger cross-section at the media-facing surface 514 than along back edges 520, 521.

Other shapes of outer sidewalls may be used. For example, outer sidewalls may have a shape including combinations of linear, curved, segmented portions. The outer sidewalls may result in the fill materials 518, 519 having a smaller cross-section at the media-facing surface 514 than along the back edges 520, 521. The fill materials 518, 519 may also extend only partially along the sidewalls 506, 507, 510, 511, e.g., terminated between the media-facing surface 514 and back edges 520, 521. The back edges 520, 521 and may be formed of or coated with a reflective material.

Like the previous example, the fill materials 518, 519 may include a metal or dielectric. The fill materials 518, 519 are selected to assist in mechanical stabilization (forming a bumper/landing pad, reducing protrusion, reducing temperatures) at the media-facing surface 514 during localized heating of the region near the near-field transducer 512. The fill materials 518, 519 may also assist in blocking stray light from exiting around the solid immersion mirror 504. Additional structures (not shown) such as a lapping guide may be embedded in the region covered by the fill materials 518, 519.

Figure 6:
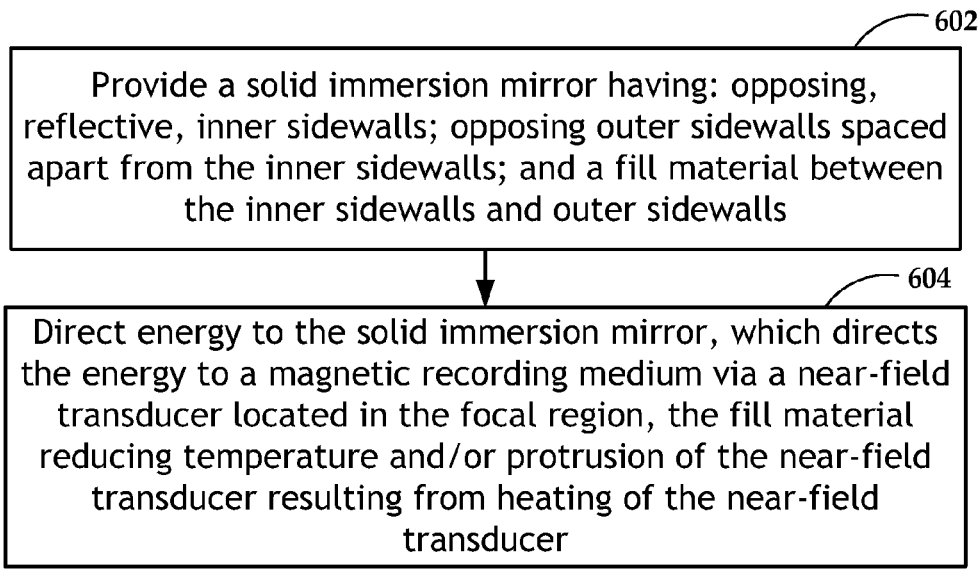
FIGS. 6 and 7 are flowcharts illustrating methods according to example embodiments.

In reference now to FIG. 6, a flowchart illustrates a method according to an example embodiment. The method involves providing 602 a solid immersion mirror that has opposing, reflective, inner sidewalls. The inner sidewalls have inner surfaces facing a focal region and outer surfaces opposite the inner surfaces. The solid immersion mirror also has opposing outer sidewalls spaced apart from and facing the outer surfaces of the inner sidewalls, and a fill material between the inner sidewalls and outer sidewalls.

The method involves directing 604 energy to the solid immersion mirror, which directs the energy to a magnetic recording medium via a near-field transducer located in the focal region. The fill material reduces one or both of temperature and protrusion of the near-field transducer resulting from heating of the near-field transducer and nearby regions.

Figure 7:
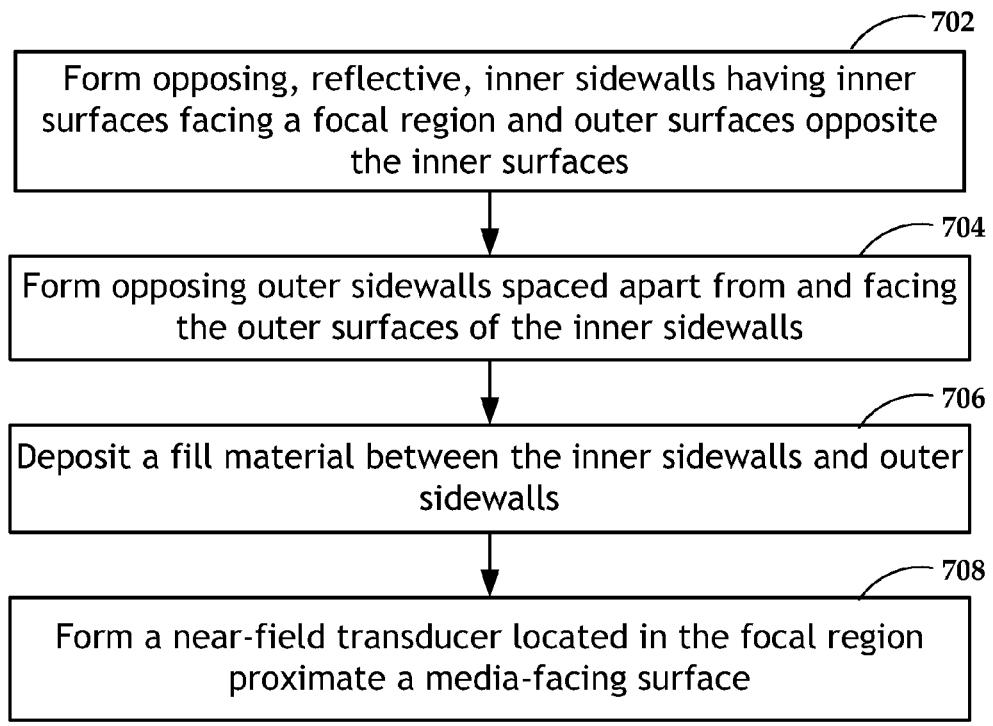

In reference now to FIG. 7, a flowchart illustrates a method according to another example embodiment. The method involves forming 702 opposing, reflective inner sidewalls having inner surfaces facing a focal region and outer surfaces opposite the inner surfaces. Opposing outer sidewalls are also formed 704, the outer sidewalls spaced apart from and facing the outer surfaces of the inner sidewalls. A fill material is deposited 706 between the inner sidewalls and outer sidewalls. The method further involves forming 708 a near-field transducer located in the focal region proximate a media-facing surface.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
   a solid immersion mirror comprising:
   opposing, reflective, inner sidewalls having inner surfaces facing a focal region and outer surfaces opposite the inner surfaces;
   opposing outer sidewalls spaced apart from and facing the outer surfaces of the inner sidewalls; and
   a fill material between the inner sidewalls and outer sidewalls, the fill material extending to a media-facing surface; and
   a near-field transducer located in the focal region proximate the media-facing surface, wherein the fill material protrudes during heating to form a landing pad that protects the near-field transducer from contact with a recording medium.

2. The apparatus of claim 1, wherein the fill material is selected to reduce at least one of a temperature of the near-field transducer and a thermal protrusion of the near-field transducer from the media-facing surface.

3. The apparatus of claim 1, wherein the fill material comprises a metal.

4. The apparatus of claim 3, wherein the metal comprises an alloy of Fe.

5. The apparatus of claim 3, wherein the metal comprises at least one of Cr, Ta and Ru.

6. The apparatus of claim 1, wherein the fill material comprises a nitride.

7. The apparatus of claim 6, wherein the nitride comprises at least one of TaN and SiN.

8. The apparatus of claim 1, wherein the inner sidewalls are parabolic.

9. The apparatus of claim 8, wherein the outer sidewalls are parabolic.

10. An apparatus comprising:
    a solid immersion mirror comprising:
    opposing, reflective, inner sidewalls having inner surfaces facing a focal region and outer surfaces opposite the inner surfaces;
    opposing reflective outer sidewalls spaced apart from and facing the outer surfaces of the inner sidewalls; and
    a fill material between the inner sidewalls and outer sidewalls; and a near-field transducer located in the focal region proximate a media-facing surface.

11. An apparatus comprising:
a slider comprising:
an optical coupling path that receives energy from the laser diode;
a solid immersion mirror comprising a fill material between inner sidewalls and outer sidewalls, the inner sidewalls reflecting the energy from the optical coupling path to a focal point; and
a near-field transducer located in a focal region of the solid immersion mirror that directs the energy to a recording medium, wherein the fill material is selected to reduce at least one of a temperature of the near-field transducer and a thermal protrusion of the near-field transducer from a media-facing surface of the slider.

12. The apparatus of claim 11, wherein the fill material extends to the media-facing surface of the slider.

13. The apparatus of claim 11, wherein the fill material comprises a metal.

14. The apparatus of claim 11, wherein the fill material comprises a dielectric.

15. The apparatus of claim 11, wherein the fill material protrudes during heating to form a landing pad that protects the near-field transducer from contact with the recording medium.

16. The apparatus of claim 11, wherein the outer sidewalls are reflective.

17. A method comprising:
providing a solid immersion mirror comprising:
opposing, reflective, inner sidewalls having inner surfaces facing a focal region and outer surfaces opposite the inner surfaces;
opposing outer sidewalls spaced apart from and facing the outer surfaces of the inner sidewalls; and
a fill material between the inner sidewalls and outer sidewalls; and
directing energy to the solid immersion mirror, which directs the energy to a magnetic recording medium via a near-field transducer located in the focal region, the fill material reducing protrusion of the near-field transducer resulting from the near-field transducer being heated by the energy.

* * * * *